United States Patent
Bouvy et al.

(10) Patent No.: US 6,780,910 B2
(45) Date of Patent: Aug. 24, 2004

(54) ALKYD RESIN EMULSION

(75) Inventors: Alain Bouvy, Wezembeek Oppem (BE); Bart Simon Alfons Dehuvyne, Dilbeek (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/304,016

(22) Filed: Nov. 26, 2002

(65) Prior Publication Data

US 2003/0144397 A1 Jul. 31, 2003

Related U.S. Application Data

(63) Continuation of application No. PCT/GB01/02191, filed on May 17, 2001.

(30) Foreign Application Priority Data

May 31, 2000 (GB) ................................................ 0013028

(51) Int. Cl.$^7$ .............................. C08J 3/00; C08K 5/06; C08L 67/00; C08L 73/00; C08L 79/00
(52) U.S. Cl. ........................ 524/376; 524/77; 524/366; 524/599
(58) Field of Search ................................. 524/366, 376, 524/77, 599

(56) References Cited

FOREIGN PATENT DOCUMENTS

| EP | 649867 A1 | * | 4/1995 |
| GB | 1223033 | | 2/1971 |
| GB | 1535786 | | 12/1978 |
| WO | WO 99/58617 | | 11/1999 |

* cited by examiner

Primary Examiner—Patrick D. Niland
(74) Attorney, Agent, or Firm—Mayer, Brown Rowe & Maw LLP

(57) ABSTRACT

An aqueous emulsion of an alkyd resin which contains as an emulsifier at least one branched primary alcohol alkoxylate of the formula (I): $[CH_3.(CH_2)_n][CH_3.(CH_2)_m].CH.[(CH_2)_p.O.(AO)_q.H]$, where n and m are each independently from 1 to 13; and p is 1 or 2; such that n+m+p is from 5 to 15; AO is an alkylene oxide residue having from 2 to 4 carbon atoms, and q is from 5 to 50. The alkyd emulsion is particularly suitable for use as a waterborne paint or surface coating composition.

13 Claims, No Drawings

ALKYD RESIN EMULSION

CROSS REFERENCE TO RELATED APPLICATION

This application is a continuation of International Application No. PCT/GB01/02191, filed May 17, 2001. This application, in its entirety, is incorporated herein by reference.

This invention relates to emulsions and in particular to aqueous emulsions of polyesters and more particularly to oil-modified polyester resins also known as alkyd resins and to their production.

Polyester resins are well known materials with wide uses in surface coatings e.g. paints. Generally, they are film forming substances which are the products of esterification of polybasic acids and polyhydric alcohols. They can be either saturated or unsaturated. Typical applications of polyesters include industrial wood coatings, can and coil coatings, industrial enamels, domestic appliances coatings and stoving enamels.

Alkyd resins are the largest group of synthetic resins used in the coating industry, are polyester resins which include residues of polybasic, usually di-basic, acid(s) and polyhydroxy, usually tri- or higher hydroxy alcohols and further including monobasic fatty acid residues. The monobasic residues may be derived (directly or indirectly) from oils (fatty acid triglycerides) and alkyd resins are also referred to as oil modified polyester resins. Alkyds used in surface coatings are generally curable usually either from residual carboxyl and hydroxyl functionality or by unsaturation (often multiple unsaturation) in the monobasic fatty acid residues. Some alkyds are used as plasticisers e.g. for other alkyd resins, and these materials are not usually curable. Alkyd resins may include other residues and/or additives to provide specific functionality for the intended end use e.g. sources of additional carboxyl groups may be included to improve water compatibility. Alkyds have found widespread use in paints, particularly solvent based paints. In developing low VOC's formulations, much effort has been directed to making aqueous emulsions of alkyd resins, (including those using mixed solvent/water vehicles). The alkyds are usually formed into an emulsion before incorporation into the paint and emulsification typically involves formation of an alkyd in water emulsion in which the alkyd is dispersed in the water phase as uniformly and generally as finely as possible. To do this emulsifiers, either as single components or in combination, are commonly used.

The present invention is based on our finding that combinations of certain classes of alcohol alkoxylates, particularly ethoxylates, based on branched primary alcohols can give alkyd resin emulsions in water that have a low average particle size and narrow particle size distribution.

Accordingly, the present invention provides an aqueous emulsion of an alkyd resin which comprises as an emulsifier at least one branched primary alcohol alkoxylate of the formula (I):

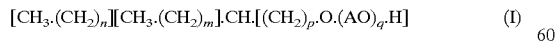

$$[CH_3.(CH_2)_n][CH_3.(CH_2)_m].CH.[(CH_2)_p.O.(AO)_q.H] \quad (I)$$

where n and m are each independently from 1 to 13; and p is 1 or 2; such that n+m+p is from 5 to 15;

AO is an alkylene oxide residue having from 2 to 4 carbon atoms; and q is from 5 to 50.

Within the invention, we have found that particularly good results may be obtained using combinations of non-ionic surfactants, including compounds of the formula (I), and anionic surfactants to emulsify alkyd resins. Accordingly, the invention further provides an aqueous emulsion of an alkyd resin which comprises as an emulsifier at least one branched primary alcohol alkoxylate of the formula (I) above in combination with at least one anionic surfactant In compounds of the formula (I), n and m are desirably each independently at least 2 and not more than 12, p is desirably 1 and the total number of carbon atoms in the branched alkyl residue is desirably from 8 to 18, particularly 10 to 15 and especially is about 12 (corresponding to n+m+p from 5 to 15, particularly 7 to 12 and especially about 9). Mixtures of compounds having such branched residues can be used.

The alkylene oxide groups are desirably ethylene oxide and/or propylene oxide residues. Desirably, all the residues are ethylene oxide residues although mixtures of ethylene oxide and propylene oxide residues, desirably with a molar ratio of ethylene oxide to propylene oxide residues from 1:5 to 10:1, can be used. When mixed alkylene oxide residues are used, the polyoxyalkylene chain can be a random or block copolymeric chain. Within the range 5 to 50, q is desirably 10 to 30. The number of units in the polyoxyalkylene chain, 'q', is an average value and may be non-integral.

The alkoxylates of the formula (I) can be used alone or and desirably, in combination with similar alkoxylates of linear primary alcohols, containing similar numbers of carbon atoms. The proportion of branched alkoxylate, of the formula (I), is desirably at least 30% and more usually at least 40%.

The alkoxylates used in this invention can be made by alkoxylation of the corresponding primary alcohols under conventional alkoxylation conditions, typically under alkali catalysis, particularly alkoxide catalysis e.g. using NaOH or KOH to form alkoxide in situ. Where the alkoxylate is wholly of the formula (I), the alcohol used is substantially wholly branched primary alcohol as can be made by the guerbet process. Where the alkoxylate is a combination of alkoxylates of the formula (I) with similar alkoxylates of linear primary alcohols, the alcohol used can be a mixture of the branched primary alcohols with linear primary alcohols, containing similar numbers of carbon atoms. Such mixed alcohols can be made by the oxo process using feedstocks including internal olefins (internal olefins isomerise under typical oxo reaction conditions).

The term non-ionic surfactant is sometimes herein used to refer to branched or mixtures of branched and linear alcohol alkoxylates used in this invention.

The alkyd resins used in this invention are typically resins which are the reaction products of:

one or more polybasic (di- or higher basic) organic acid/anhydride: e.g. phthalic anhydride, one or more polyhydric (usually a tri- or higher) alcohol: e.g. glycerol; and one or more monobasic fatty acid, usually an unsaturated fatty acid, or one or more ester, particularly triglyceride of such fatty acids: e.g. soya oil, tall oil fatty acids.

The molar proportions of these component monomers are chosen to give the desired physical properties and molecular weight distribution of the resulting polyester. The monobasic fatty acid or triglyceride, often includes unsaturation e.g. vegetable oils or fatty acids, and the presence of unsaturation leads to the air-curing properties of these materials. Most alkyds are film-forming polymers with a relatively low glass transition temperature, typically below 0° C., that are readily pigmented and usually accept additives to form coatings with a wide range of appearance, performance, and application characteristics. The alkyd resins used in this invention are typically air-curing types as used in surface coating end use applications. Typically alkyd resins used in this invention will have an oil length of from 25 to 100%, typically from 50 to 80%. Siliconized alkyds can also be used. Suitable alkyds are widely available and are used extensively in surface coating applications.

Although effective emulsification can be achieved using surfactants of the formula (I) on their own, they can also be used in combination with anionic surfactants particularly phosphate esters, ether carboxylates, alkyl ether sulphate, alkyl aryl sulphonates or mixtures of these types of anionic surfactants.

Ether carboxylates which can be used in the invention are typically of the formula (II):

$R^1O-(EO)_n-CH_2CO_2M$ (II)

where $R^1$ is a $C_{10}$ to $C_{18}$ hydrocarbyl, particularly a $C_{12}$ to $C_{16}$ alkyl, group;

EO is an ethyleneoxy group;

n is from 3 to 10, particularly 4 to 8, especially about 6; and

M is hydrogen, alkali metal, especially Na or K or ammonium (including amine onium).

In formula (II) $R^1$ can represent mixed groups e.g. mixed alkyl groups such as mixed $C_{13}$ to $C_{15}$ alkyl groups, as are commonly used in making surfactants and n (like q in formula (I)) is an average value and may be non-integral. Ether carboxylates are commonly supplied in the free acid form and for use as surfactants are usually neutralised (see below).

Suitable alkyl aryl sulphonates include alkyl benzene sulphonates, typically $C_8$ to $C_{18}$ linear alkyl benzene sulphonates. These are well known surfactants and are usually sold as salts with suitable bases. If supplied as free acids, they can be neutralised (see below).

When used, the weight ratio of non-ionic surfactant (comprising compound(s) of the formula (I)) to anionic surfactant, particularly alkyl aryl sulphonate, ether carboxylate or a mixture, is usually from 90:10 to 10:90, desirably 80:20 to 20:80, and particularly 75:25 to 25:75.

The invention further includes an aqueous emulsion of an alkyd resin which comprises as an emulsifier at least one branched primary alcohol alkoxylate of the formula (I) above in combination with an anionic surfactant, particularly an alkyl benzene sulphonate; an ether carboxylate surfactant of the formula (II) above, or a mixture of these anionic surfactants, in particular where the weight ratio of non-ionic surfactant, comprising compound(s) of the formula (I), to anionic surfactant is from 80:20 to 20:80.

The anionic surfactants contain acidic groups which will usually be reacted (at least mainly) with counter ions to form salts before use. This can be done in manufacture of the surfactants e.g. as is usual with alkyl aryl sulphonates, and typical counter ions include alkali metal ions, particularly sodium and potassium, ammonium ions and amine onium, particularly derived from alkanolamines such as di-ethanolamine (DELA) and tri-ethanolamine (TELA). Usually ether carboxylate surfactants are supplied in the free acid form and are typically neutralised at the point of use or in situ during emulsification. Neutralisation can be effected using suitable base such as alkali metal (particularly sodium or potassium) hydroxide or carbonate or amines, particularly alkanolamines such as DELA and TELA.

In particular where an ether carboxylate is used as an anionic surfactant, the emulsion desirably comprises one or more neutralising agents. Generally, the neutralising agent is added to and well mixed with the anionic surfactant, usually by mixing into a blend of the non-ionic and anionic surfactants and the resin to be emulsified, before adding the bulk of the water used in emulsification. The ether carboxylate can be neutralised before mixing with the resin, but this is less convenient because the resin may contribute to the neutralisation requirement. For this reason an excess over the nominal amount of neutralisation agent will usually be used. Amounts of neutralising agent are typically from 0.5 to 5% by weight of the emulsion, although, in practice, the amount of neutralising agent used will normally be that sufficient to achieve a pH, within a desired range in the product emulsion. Desirably the product emulsion will typically have a pH of from 3 to 9, particularly 5 to 8.5. Modest amounts of base may be added to the system to obtain such pH's by neutralising acidity in the alkyd resin even where the anionic surfactant is used in the form of a salt or where no anionic surfactant is used.

The emulsions will typically contain from 45 to 60, more usually from 40 to 55 and particularly about 50% by weight of the emulsified resin.

The total amount of surfactant, non-ionic and (when used) anionic, used as emulsifier in this invention will typically be from 2 to 20%, more usually from 5 to 15%, and desirably from 6 to 10%, by weight based on alkyd resin emulsified. In general lower amounts of emulsifier give emulsions with larger average particle size and usually higher polydispersity, generally implying a longer 'tail' of relatively coarse emulsion droplets. Based on emulsions containing 50% of alkyd resin these correspond to general amounts of surfactant of from 1 to 10%, more usually from 2.5 to 7.5% and desirably from 2.5 to 5% by weight on the total emulsion. The amounts used for emulsions containing other alkyd resin concentrations will vary accordingly.

Typical emulsion compositions by weight are exemplified in the following table:

| Material | amount (parts by weight) | |
|---|---|---|
| | typical | preferred |
| alkyd resin | 40 to 60 | about 50 |
| total surfactant | 0.5 to 7 | 0.6 to 6 |
| % surfactant on resin | 2 to 20 | 5 to 10 |
| when anionic surfactant used: | | |
| non-ionic | 0.5 to 5.5 | 2 to 5 |
| anionic | 0.5 to 5.5 | 2 to 5 |
| wt ratio non-ionic: anionic | 90:10 to 10:90 | 75:25 to 25:75 |
| neutralising agent (1) | pH 3 to 8 | |
| water | | to 100 |

(1) the neutralising agent (base) (if any) is used to give a pH in the stated range (and may include base which neutralises acidity in the alkyd resin).

The emulsions of the invention can be and are desirably made by inverse emulsification, in particular by forming a mixture of the resin and surfactant, including surfactant of the formula (I), adding water to form a water in oil (resin) emulsion, continuing water addition until the emulsion inverts to form an oil (resin) in water emulsion and, if necessary e.g. to prevent re-inversion of the emulsion and/or to adjust the solids content of the emulsion, adding further water to adjust the disperse phase content of the emulsion to that desired. This technique is known in the art as the Emulsion Inversion Point (EIP) method.

The invention accordingly includes a method of making an aqueous emulsion of a resin, particularly an alkyd resin, which comprises forming a mixture of the resin and surfactant, comprising at least one branched primary alcohol alkoxylate surfactant of the formula (I), comprising water in the mixture to form a water in oil (resin) emulsion, and subsequently adding water to the water-in-oil emulsion at least until the emulsion inverts to form an oil (resin) in water emulsion and, optionally, adding further water to adjust the disperse phase content of the emulsion to that desired.

Generally, at least prior to the inversion to form an oil-in-water emulsion, the viscosity of the mixture is typically fairly high (reflecting the viscosity of the resin continuous phase) and to effect good mixing, the mixture will be stirred vigorously. Usually, after inversion, the stirring effort can be reduced because the viscosity falls substantially. (Also the mixing is not providing energy for substantial increase in net inter-phase surface area.)

The temperature at which the emulsion is prepared depends on the viscosity of liquid resins and the softening and/or melting point of solid resins and the properties of the softened and/or melted resin. Resins which are liquid at ambient temperature, such as many alkyd resins, are usually sufficiently viscous to make it inconvenient to carry out emulsification at temperatures as low as ambient. For such resins, the temperature of emulsification will be moderately superambient, typically up to about 75° C. e.g. in the range 30 to 75° C., particularly 40 to 60° C. and especially about 50° C. can be used.

The emulsions of the invention can provide alkyd resins in the form of emulsion droplets having an average diameter of less than 500 nm, and frequently less than 300 nm.

The emulsions, particularly alkyd resin emulsions, of the invention can be used to make waterborne paints or coatings by mixing with at least one separately prepared pigment dispersion. This very well known method by those skilled in the art—often called "letdown"—is typically carried out under gentle agitation. The success of the letdown step depends on achieving an intimate intermingling of these two disparate particle systems to yield a stable and uniform overall particle suspension (the alkyd-based paint) and the emulsions of this invention can be effectively used in such systems. The invention accordingly further includes a waterborne paint or surface coating composition which comprises an alkyd emulsion of the invention.

The practical performance of such paint formulations can be improved by including other additives. Examples include:

- driers (or curing catalysts) which are typically oil/resin soluble metal salts such as naphthenates, typically incorporated at levels of 1 to 10% by weight of the resin;
- co-driers, also described as loss of dryness inhibitors as they can counter possible inhibition of driers by the presence of e.g. anioninc surfactants or emulsifiers, so that their inclusion can give faster or more complete hardening of the resin film in a coating thus enhancing performance, typically used at levels of 1 to 10% by weight of the resin;
- rheology modifiers;
- wetting and compatibility agents; and
- flow and levelling agents which will typically be incorporated at this stage. Typical applications of formulations include wood coatings and high gloss architectural paints.

The following Examples illustrate the invention. All parts and percentages are by weight unless otherwise stated.

Materials

Branched Primary Alcohols

AL1 mixture of primary alcohols mainly having 12 to 15 carbon atoms and containing about 50% monobranched primary alcohol and about 50% linear primary alcohol made by the oxo process from internal olefin precursors Branched Primary Alcohol Alkoxylate Surfactants AE1 AL1 5-ethoxylate
AE2 AL1 12.5-ethoxylate Other Surfactants AS1 C14/15 alcohol 6-ethoxylate ethercarboxylate (acid form) 90% active
AS2 Atsurf 3300B anionic surfactant—alkyl aryl sulphonate 95% active ex Uniqema
PS1 Hypermer A119 polymeric surfactant 100% active ex Uniqema
SB1 Atsurf 3863 proprietary anionic/nonionic surfactant blend (80% active) ex Uniqema
SB2 Atsurf 3969 proprietary nonionic surfactant blend (100% active) ex Uniqema Alkyd Resins RA1 Long oil tall oil alkyd resin, 72% tall oil fatty acid, 19% isophthalic acid (100% active)
RA2 Long oil alkyd resin, approx. 72% oil length (100% active)
RA3 Short oil soybean alkyd resin, oil length ca. 45% (100% active)
RA4 Long oil tall oil alkyd resin, oil length ca. 74% (100% active)
RA5 Linoleic rich fatty acid alkyd resin, oil length ca. 59% (100% active)
RA6 Soybean oil based alkyd resin, oil length ca. 58% (100% active)
RA7 Soybean oil based alkyd resin, oil length ca. 63% (100% active)

Other Materials

TELA commercial triethanolamine ca 99% by weight
NaOH 10% aqueous NaOH solution
MeOPr 2-methoxypropanol (co-solvent)
water demineralised water Methods Emulsion Manufacture Alkyd resin emulsions were made by the inversion emulsification method in 250 ml or 500 ml vessels using an IKA RW 20.n mixer with stirring using a paddle bladed stirrer at a rotational speed of 2000 rpm (ca 33 Hz) with a 4 cm diameter 6-bladed paddle (unless otherwise stated). The temperature of emulsification ranged from ambient to 90° C. The resin and a small amount of water were heated (if necessary) to the emulsification temperature, the surfactant(s) were then added and blended thoroughly. If necessary, neutralising agent (for resin and/or anionic emulsifier) was added and mixed in thoroughly. Further water was added gradually under mixing. Initially a water in oil (alkyd) emulsion (having poor stability) is formed and the viscosity of this emulsion increases as more water is added up to a maximum at or near the inversion point. The mixing during water addition is sufficient to form a homogeneous (water in oil) emulsion. With the addition of more water the emulsion will reach a point where inversions occurs to form an oil (alkyd) in water emulsion. After inversion the viscosity usually falls so stirring may be less vigorous e.g. about 300 rpm (5 Hz), and further water can be added relatively quickly. If necessary the emulsion is then cooled to ambient temperature and as required further water added to reach the desired product composition.

Particle size analysis—emulsion particle size was measured using a Malvern Zetasizer 4 (covering the size range 50 nm to 1 μm) and the particle size reported as cumulative Z-average (Z-av) in nm, instrumentally calculated polydispersity (Poly) and peak width of the largest peak (Width) in nm.

Viscosity—emulsion viscosity was measured using a Brookfield LVT viscometer at about 25° C., the spindle used is indicated in brackets in the table headings e.g. (sp1). Results are given in mPa.s.

pH—was measured using a WTW pH 537 meter

Ageing—some emulsion samples were stored (aged) and re-tested. The extent of ageing is indicated by a code in the tables. The first character of the code indicates the length of storage (0=no ageing), the next two characters indicate the storage time in months (m=month), and any further characters indicate the (non-ambient) temperature of storage in ° C.; so, for example, '1 m/5' indicates 1 month storage at 5° C. and '3 m/-5/40' indicates 3 months storage with freeze thaw cycling between −5° C. and 40° C. with a cycle time of 12 hours.

In the Examples 'Ratio' is the weight ratio of non-ionic to anionic surfactant and Surf % is the weight percentage of total surfactant based on the alkyd resin.

EXAMPLE 1

Alkyd resin emulsions were made up using resin RA2 using combinations of alcohol ethoxylate AE1 and anionic surfactant AS2. For Samples 1.1 to 1.6, the inversion emulsion process was carried out at 50° C. and for Sample 1.7 the process temperature was ambient temperature. Just after completion of water addition, a drop of antifoam was added to knock down any foam generated during the emulsification process. The formulations and properties of these emulsions are set out in Table 1a below.

TABLE 1a

| Sample No | Amounts (parts by weight) | | | | | | Particle size |
|---|---|---|---|---|---|---|---|
| | AE1 | AS2 | RA2 | water | Ratio | Surf % | Z-av |
| 1.1 | 3.75 | 1.25 | 50 | to 100 | 80:20 | 10 | 250 |
| 1.2 | 2.5 | 2.5 | 50 | to 100 | 50:50 | 10 | 148 |
| 1.3 | 3.75 | 1.25 | 50 | to 100 | 20:80 | 10 | 772 |
| 1.4 | 2 | 2 | 50 | to 100 | 50:50 | 8 | 172 |
| 1.5 | 1.5 | 1.5 | 50 | to 100 | 50:50 | 6 | 624 |
| 1.6 | 1 | 1 | 50 | to 100 | 50:50 | 4 | 2507 |
| 1.7 | 2.5 | 2.5 | 50 | to 100 | 50:50 | 10 | 230 |

These results show the finest emulsion at a weight ratio of the two surfactants of about 50:50; that the finest emulsion is obtained at a concentration of emulsifier of about 8% by weight of the resin; and that preparation at 50° C. gave a somewhat finer emulsion.

Further amounts of Sample 1.4 were made by the method described above and the emulsion subjected to storage stability testing. The larger scale of preparation is believed to be the reason for the slightly larger initial particle size obtained. The results are set out in Table 1b:

TABLE 1b

| Sample No | Age | Viscosity | | | Particle Size | |
|---|---|---|---|---|---|---|
| | | 6 rpm | 30 rpm | 60 rpm | Z-av | Poly |
| 1.4 | 0 | 702 | 390 | 281 | 210 | 0.090 |
| | 1 m | 780 | 390 | 289 | 216 | 0.050 |
| | 1 m/-5 | 702 | 406 | 296 | 246 | 0.207 |
| | 1 m/40 | 702 | 374 | 289 | 212 | 0.100 |

The formulation showed stability under storage under a wide temperature range.

EXAMPLE 2

Alkyd resins RA1 and RA2 were emulsified using a combination of alcohol ethoxylate AE1 and anionic surfactant AS2. For resin RA1 the emulsification temperature used was 70° C. and for RA2 ambient temperature. The composition of the formulations is given in Table 2a:

TABLE 2a

| Sample No | RA No | Amounts of components (parts by weight) | | | | Ratio | Surf % |
|---|---|---|---|---|---|---|---|
| | | RA | AE1 | AS2 | water | | |
| 2.1 | RA1 | 50 | 3.25 | 1.75 | to 100 | 80:20 | 10 |
| 2.2 | RA1 | 50 | 1.4 | 2.6 | to 100 | 35:65 | 8 |
| 2.3 | RA2 | 50 | 3 | 2 | to 100 | 60:40 | 10 |
| 2.4 | RA2 | 50 | 2.4 | 1.6 | to 100 | 60:40 | 8 |

Samples of these emulsions were subjected to storage stability tests and the results are set out in Table 2b:

TABLE 2b

| Sample No | Age | pH | Visc (sp*) 60 rpm | Particle Size | | |
|---|---|---|---|---|---|---|
| | | | | Z-av | Poly | Width |
| 2.1 | 0 | 4.4 | 640 | 172 | 0.12 | 81 |
| | 1 m | 4.3 | 570 | 180 | 0.1 | 40 |
| | 1 m/5 | 4.3 | 560 | 177 | 0.04 | 30 |
| | 1 m/40 | 4.3 | 660 | 171 | 0.1 | 85 |
| | 3 m | 4.2 | 600 | 174 | 0.09 | 26 |
| | 3 m/5 | 4.2 | 610 | 171 | 0.03 | 71 |
| | 3 m/40 | 4.3 | 860 | 169 | 0.04 | 70 |
| 2.2 | 0 | 4.4 | 610 | 163 | 0.07 | 70 |
| | 1 m | 4.4 | 580 | 171 | 0.1 | 83 |
| | 1 m/-5 | 4.3 | 560 | 175 | 0.12 | 102 |
| | 1 m/5 | 4.4 | 560 | 181 | 0.1 | 82 |
| | 1 m/40 | 4.4 | 560 | 179 | 0.12 | 98 |
| | 3 m | 4.3 | 570 | 174 | 0.06 | 29 |
| | 3 m/5 | 4.3 | 590 | 174 | 0.13 | 66 |
| | 3 m/40 | 4.3 | 700 | 178 | 0.05 | 34 |
| 2.3 | 0 | 4.4 | 860 | 157 | 0.01 | 42 |
| | 1 m | 4.3 | 340 | 159 | 0.06 | 95 |
| | 1 m/5 | 4.4 | 750 | 159 | 0.09 | 117 |
| | 1 m/40 | 4.3 | 675 | 160 | 0.05 | 90 |
| | 3 m | 4.4 | 330 | 144 | 0.03 | 63 |
| | 3 m/5 | 4.4 | 830 | 144 | 0.08 | 95 |
| | 3 m/40 | 4.3 | 840 | 141 | 0.09 | 102 |
| | 6 m | 4.2 | 305 | 161 | 0.06 | 91 |
| | 6 m/5 | 4.3 | 770 | 164 | 0.12 | 135 |
| | 6 m/40 | 3.9 | 1000 | 165 | 0.08 | 111 |
| 2.4 | 0 | 4.3 | 480 | 200 | 0.01 | 42 |
| | 1 m | 4.3 | 260 | 191 | 0.09 | 139 |
| | 1 m/5 | 4.3 | 450 | 193 | 0.07 | 120 |
| | 1 m/40 | 4.3 | 375 | 199 | 0.1 | 154 |
| | 3 m | 4.3 | 260 | 176 | 0.01 | 31 |
| | 3 m/5 | 4.3 | 455 | 183 | 0.04 | 86 |
| | 3 m/40 | 4.2 | 435 | 178 | 0.08 | 123 |
| | 6 m | 4.0 | 245 | 198 | 0.04 | 97 |
| | 6 m/5 | 4.2 | 430 | 194 | 0.01 | 50 |

*Spindle 3 was used for Samples 2.1 and 2.2 and spindle 2 for samples 2.3 and 2.4

These data show that these emulsions have good storage stability under a range of temperature conditions, although samples 2.3 and 2.4 showed a slight reduction in pH after 6 months at 40° C., but without adverse effect on emulsion quality.

EXAMPLE 3

Alkyd resins RA3, RA4, RA5 and RA6 were emulsified using a combination of alcohol ethoxylate AE1 and anionic surfactants AS1 and AS2 alone or in combination as set out in Table 3a:

TABLE 3a

| Sample No | RA No | Amounts (parts by weight) | | | | | |
|---|---|---|---|---|---|---|---|
| | | RA | AS1 | AS2 | AE1 | NaOH | TELA | Water |
| 3.1 | RA3 | 51.5 | 1.28 | — | 3.87 | 2.56 | — | to 100 |
| 3.2 | RA4 | 53.57 | — | 1.45 | 1.77 | — | — | to 100 |
| 3.3 | RA5 | 50 | 1.5 | 1.0 | 2.5 | — | 1.5 | to 100 |
| 3.4 | RA6 | 50 | 1.2 | 0.8 | 2.0 | — | 1.5 | to 100 |

For Sample 3.1, NaOH was used to neutralise the ether carboxylate and for samples 3.3 and 3.4, TELA was used. The results of testing during storage are set out in Table 3b:

TABLE 3b

| Sample No | Age | pH | Visc (sp3) 60 rpm | Particle Size | | |
|---|---|---|---|---|---|---|
| | | | | Z-av | Poly | Width |
| 3.1 | 0 | 6.9 | 1090 | 158 | 0.18 | 116 |
| | 1 m | 6.6 | 740 | 159 | 0.17 | 101 |
| | 1 m/5 | 6.6 | 980 | 165 | 0.12 | 92 |
| | 1 m/40 | 6.4 | 290 | 168 | 0.03 | 70 |
| | 3 m | 6.4 | 570 | 159 | 0.12 | 91 |
| | 3 m/5 | 6.8 | 910 | 138 | 0.05 | 58 |
| | 3 m/40 | 5.0 | 200 | 152 | 0.11 | 71 |
| 3.2 | 0 | 3.7 | 333 | 262 | 0.31 | 37 |
| | 1 m | 3.7 | 318 | 222 | 0.96 | 33 |
| | 1 m/−5 | 3.8 | 295 | 241 | 0.66 | 30 |
| | 1 m/5 | 3.8 | 308 | 238 | 0.28 | 25 |
| | 1 m/40 | 3.7 | 308 | 240 | 0.92 | 29 |
| | 1 m/−5/40 | 3.7 | 308 | 248 | 0.61 | 86 |
| | 3 m | 3.8 | 318 | 245 | 0.66 | 32 |
| | 3 m/5 | 3.7 | 315 | 226 | 0.53 | 86 |
| | 3 m/40 | 3.7 | 388 | 235 | 0.82 | 81 |
| | 3 m/−5/40 | 3.6 | 310 | 239 | 1.00 | 44 |
| 3.3 | 0 | — | — | 191 | 0.18 | 197 |
| 3.4 | 0 | — | — | 201 | 0.13 | 179 |

EXAMPLE 4

Emulsions were made up using resin RA4 and combinations of alcohol ethoxylate AE1 and anionic surfactant AS2 according to the invention and for comparison using combinations of polymeric surfactant PS1 and AS2 and using surfactant blend SB1. The formulations and particle size results are given in Tables 4a and 4b:

TABLE 4a

| Sample No | Amounts (parts by weight) | | | | | | | |
|---|---|---|---|---|---|---|---|---|
| | RA4 | AE1 | AS2 | PS1 | SB1 | Water | Ratio | Surf % |
| 4.1 | 50 | 2.75 | 2.25 | — | — | to 100 | 55:45 | 10 |
| 4.2 | 50 | 2.2 | 1.8 | — | — | to 100 | 55:45 | 8 |
| 4.3 | 50 | 2.15 | 1.35 | — | — | to 100 | 61:39 | 7 |
| 4C.1 | 50 | — | 2.75 | 2.25 | — | to 100 | — | 10 |
| 4C.2 | 50 | — | 2.2 | 1.8 | — | to 100 | — | 8 |
| 4C.3 | 50 | — | — | — | 6.25 | to 100 | — | 10 |

TABLE 4b

| Sample No | Particle Size | | |
|---|---|---|---|
| | Z-av | Poly | Width |
| 4.1 | 195 | 1.0 | 31 |
| 4.2 | 211 | 0.65 | 25 |
| 4.3 | 284 | 1.0 | 125 |
| 4C.1 | 412 | 1.0 | 107 |
| 4C.2 | 443 | 1.0 | 195 |
| 4C.3 | 216 | 0.63 | 32 |

The good performance of the samples according to the invention is clear. Alcohol ethoxylate AE1 used less anionic surfactant (reducing the risk of foam formation in use) and is significantly more effective on an overall weight basis than PS1 and is more effective on a weight basis-than SB1.

EXAMPLE 5

Resin RA6 was emulsified with a variety of emulsification systems some based on a combination of alcohol ethoxylate AE1 and anionic surfactant AS2 according to the invention and some for comparison based on surfactants PS1 and SB1. The formulations and particle sizes obtained are given in Tables 5a and 5b:

TABLE 5a

| Sample No | Amounts (parts by weight) | | | | | | Water | Ratio | Surf % |
|---|---|---|---|---|---|---|---|---|---|
| | RA6 | AE1 | AS2 | TELA | PS1 | SB1 | | | |
| 5.1 | 50 | 1.8 | 2.2 | 1.25 | — | — | to 100 | 45:55 | 8 |
| 5.2 | 50 | 2.25 | 2.75 | 1.55 | — | — | to 100 | 45:55 | 10 |
| 5C.1 | 50 | — | — | — | — | 6.25 | to 100 | — | 10 |
| 5C.2 | 50 | — | 2.75 | — | 2.25 | — | to 100 | — | 12 |

TABLE 5b

| Sample No | Particle Size | | |
|---|---|---|---|
| | Z-av | Poly | Width |
| 5.1 | 183 | 1.19 | 130 |
| 5.2 | 151 | 0.21 | 57 |
| 5C.1 | 301 | 0.67 | 37 |
| 5C.2 | 167 | 0.17 | 31 |

These results show that the samples of the invention are superior to the emulsions made using PS1 and SB1 in using less total surfactant.

EXAMPLE 6

Resin RA6 was emulsified with a variety of emulsification systems some based on a combination of alcohol ethoxylate AE1 and anionic surfactant AS1 according to the invention and some for comparison based on surfactants PS1, SB1 and SB2. The formulations and particle sizes obtained are given in Tables 6a and 6b:

TABLE 6a

| Sample No | Amounts (pbw) | | | additives | | other surfactant | | Water | Ratio | Surf % |
|---|---|---|---|---|---|---|---|---|---|---|
| | RA6 | AE1 | AS1 | type | amount | type | amount | | | |
| 6C.1 | 50 | — | — | MeOPr | 3.25 | SB2 | 5.3 | to 100 | — | 10.6 |
| 6C.2 | 50 | — | — | — | — | SB1 | 6.25 | to 100 | — | 10 |
| 6.1 | 50 | 1.8 | 2.2 | TELA | 1.25 | — | — | to 100 | 55:45 | 8 |
| 6.2 | 50 | 2.25 | 2.75 | TELA | 1.55 | — | — | to 100 | 55:45 | 10 |
| 6C.3 | 50 | — | 2.75 | — | — | PS1 | 2.25 | to 100 | 55:45 | 10 |

TABLE 6b

| Sample No | Particle Size | | |
|---|---|---|---|
| | Z-av | Poly | Width |
| 6C.1 | 281 | 0.31 | 383 |
| 6C.2 | 301 | 0.67 | 37 |
| 6.1 | 183 | 0.19 | 130 |
| 6.2 | 151 | 0.21 | 57 |
| 6C.3 | 167 | 0.17 | 31 |

EXAMPLE 7

Resin RA7 was emulsified with alcohol ethoxylate AE2, and a combination of alcohol ethoxylates AE1 and AE2. The formulations and particle sizes obtained are given in Tables 7a and 7b:

TABLE 7a

| Sample No | Amounts (pbw) | | | Additives | | Water | Ratio | surf % |
|---|---|---|---|---|---|---|---|---|
| | RA7 | AE2 | AE1 | type | amount | | | |
| 7a | 50 | 3.5 | — | NaOH* | 4.1 | to 100 | — | 7 |
| 7b | 50 | 5 | — | NaOH* | ca 4.0 | to 100 | — | 10 |
| 7c | 50 | 3 | 0.5 | NaOH* MeOPr | 4.1 0.5 | to 100 | 95:15 | 7 |

*10%

TABLE 7b

| Sample No | Particle Size | | |
|---|---|---|---|
| | Z-av | Poly | Width |
| 7a | 314 | 0.88 | 438 |
| 7b | 202 | 0.05 | 112 |
| 7c | 343 | 0.42 | 31 |

What is claimed is:

1. An aqueous emulsion of an alkyd resin which comprises as an emulsifier an emulsifying amount of an at least one branched primary alcohol alkoxylate of the formula(I):

$$[CH_3.(CH_2)_n][CH_3.(CH_2)].CH.[(CH_2)_p.O.(AO)_q.H] \quad (1)$$

where n and m are each independently from 1 to 13; and p is 1 or 2;

such that n+m+p is from 5 to 15;

AO is an alkylene oxide residue having from 2 to 4 carbon atoms; and q is from 5 to 50.

2. An emulsion as claimed in claim 1 in which in the compound(s) of the formula (I), n and m are each independently at least 2 and not more than 12, p is 1 and the total number of carbon atoms in the branched alkyl residue is from 8 to 18.

3. An emulsion as claimed in claim 1 in which in the compound(s) of the formula (I), q is 10 to 30; the residues AO are of ethylene oxide, propylene oxide or a mixture of ethylene oxide and propylene oxide residues; and, if the residues AO include propylene oxide residues, the molar ratio of ethylene oxide to propylene oxide residues is from 1:5 to 10:1.

4. An emulsion as claimed in claim 1 in which the compound(s) of the formula (I) are used in admixture with at least one alkoxylate of a linear primary alcohol containing a similar number of carbon atoms and in which the proportion of branched alkoxylate is at least 40%.

5. An emulsion as claimed in claim 1 in which the compound(s) of the formula (I) are used in admixture with at least one anionic emulsifier.

6. An emulsion as claimed in claim 5 in which the at least one anionic emulsifier comprises at least one of: phosphate esters, ether carboxylates, alkyl ether sulphate, alkyl aryl sulphonates or mixtures of these types of anionic surfactants.

7. An emulsion as claimed in claim 6 in which the anionic emulsifier is or comprises at least one ether carboxylate of the formula (II):

$$R^1O—(EO)_n—CH_2CO_2M \quad (II)$$

where

R is a $C_{10}$ to $C_{18}$ hydrocarbyl group;

EO is an ethyleneoxy group;

n is from 3 to 10; and

M is hydrogen, alkali metal, or ammonium.

8. An emulsion as claimed in claim 5 in which the anionic emulsifier is or comprises at least one alkyl benzene sulphonate.

9. An emulsion as claimed in claim 5 in which the weight ratio of non-ionic surfactant (comprising compound(s) of the formula(I)) to anionic surfactant is from 80:20 to 20:80.

10. An emulsion as claimed in claim 1 in which the total amount of surfactant, non-ionic and (when used) anionic, emulsifier in the emulsion is from 5 to 15% by weight of the emulsion.

11. A method of making an emulsion as defined in claim 1 which comprises the steps of forming a mixture of the resin and surfactant, comprising at least one branched primary alcohol alkoxylate surfactant of the formula (I), comprising water in the mixture to form a water in oil (resin)

emulsion, and subsequently adding water to the water-in-oil emulsion at least until the emulsion inverts to form an oil (resin) in water emulsion and, optionally, adding further water to adjust the disperse phase content of the emulsion to that desired.

12. A waterborne paint or surface coating composition which comprises an alkyd emulsion as defined in claim 1.

13. A waterborne paint or surface coating composition as claimed in claim 12 which additionally comprises at least one of: driers (or curing catalysts); co-driers; rheology modifiers; wetting and compatibility agents; and/or flow and levelling agents.

* * * * *